United States Patent [19]

Leitch et al.

[11] Patent Number: 4,942,592
[45] Date of Patent: Jul. 17, 1990

[54] SYNCHRONOUS RECEIVER FOR MINIMUM SHIFT KEYING TRANSMISSION

[75] Inventors: Clifford D. Leitch, Coral Springs; Francis R. Steel, deceased, late of Parkland, Fla., by Lynne A. Steel, legal representative

[73] Assignee: Motorola, Inc., Schaumburg, Ill.

[21] Appl. No.: 443,096

[22] Filed: Nov. 27, 1989

Related U.S. Application Data

[63] Continuation of Ser. No. 202,617, Jun. 6, 1988, abandoned.

[51] Int. Cl.$^5$ .............................................. H04L 27/14
[52] U.S. Cl. ........................................ 375/90; 375/94; 329/300; 329/302
[58] Field of Search ...................... 375/90, 47, 94, 96, 375/77, 81, 97; 370/19, 21, 22; 329/306, 304, 307, 300–303

[56] References Cited

U.S. PATENT DOCUMENTS 4,359,692 11/1982 Ryan .................................... 329/306
4,583,048 4/1986 Gumacos et al. ...................... 375/90

Primary Examiner—Benedict V. Safourek
Assistant Examiner—Marianne Huseman
Attorney, Agent, or Firm—Robert S. Babayi

[57] ABSTRACT

A receiver circuit recovers the phase of the carrier of a received MSK signal so that conventional synchronous detection techniques can be employed to demodulate the received signal. A quadrature receiver circuit (204–214) processes the received MSK signal to produce in-phase and quadrature phase baseband signals. These I-channel and Q-channel baseband signals are viewed as one signal which is expressed as a complex number; the I-channel forming the real part and the Q-channel forming the imaginary part. The baseband signal is multiplied (218 and 220) by odd and even orthogonal functions (222 and 224) and then integrated (226 and 227) over odd and even numbered two bit periods, respectively. The odd orthogonal function begins and ends on odd numbered two bit periods of the received MSK signal, while the even orthogonal function begins and ends on even numbered two bit periods. The result of the integration is a single complex number for each bit of the received signal. From each of these complex numbers, two supplementary angles are computed (228 and 229). A phase error algorithm (230) resolves which one of the two supplementary angles is the phase error between the carrier of the received MSK signal and the oscillator (208 to 302) of the quadrature circuit by selecting the angle that is closer to the phase error that was calculated for the previous bit.

20 Claims, 4 Drawing Sheets

4,942,592

SYNCHRONOUS RECEIVER FOR MINIMUM SHIFT KEYING TRANSMISSION

This is a continuation of application Ser. No. 07/202,617 filed Jun. 6, 1988, and now abandoned.

BACKGROUND OF THE INVENTION

This invention pertains to radio receiver circuits and, more particularly, to a circuit that determines the phase error between the carrier of an MSK modulated signal and the local oscillator of a quadrature receiver circuit.

Minimum shift keying (MSK) is a frequency/phase modulation technique which is used to transmit digital data, i.e., binary 1's and 0's. A graph of an arbitrary MSK signal is illustrated in FIG. 1-A in which frequency is plotted on the vertical axis and time on the horizontal axis. Referring to this figure, the transmitter's carrier frequency ($w_c$) is shifted or "deviated" by a specified amount (dw) in one direction to transmit at binary 1, while the carrier frequency is deviated in the opposite direction for a binary 0. For MSK, the deviation (dw) is $\frac{1}{4}^{th}$ the bit rate.

The convention used throughout this specification is that a binary 1 corresponds to a positive deviation ($+dw$) while a binary 0 corresponds to a negative deviation ($-dw$). It should be understood, however, that this convention is arbitrary and, in all cases, the opposite convention may be used.

To synchronously detect a received MSK signal, it is necessary for the receiver to recover the carrier from the signal. But the carrier is suppressed (the signal frequency is either at $w_c+dw$ or $w_c-dw$, but never at $w_c$), so the receiver must somehow recover the carrier and its phase from the signal. Accordingly, the invention described below provides a means for recovering the carrier phase so that conventional synchronous detection techniques can be employed to demodulate the signal.

DESCRIPTION OF PREFERRED EMBODIMENTS

Figure 1:
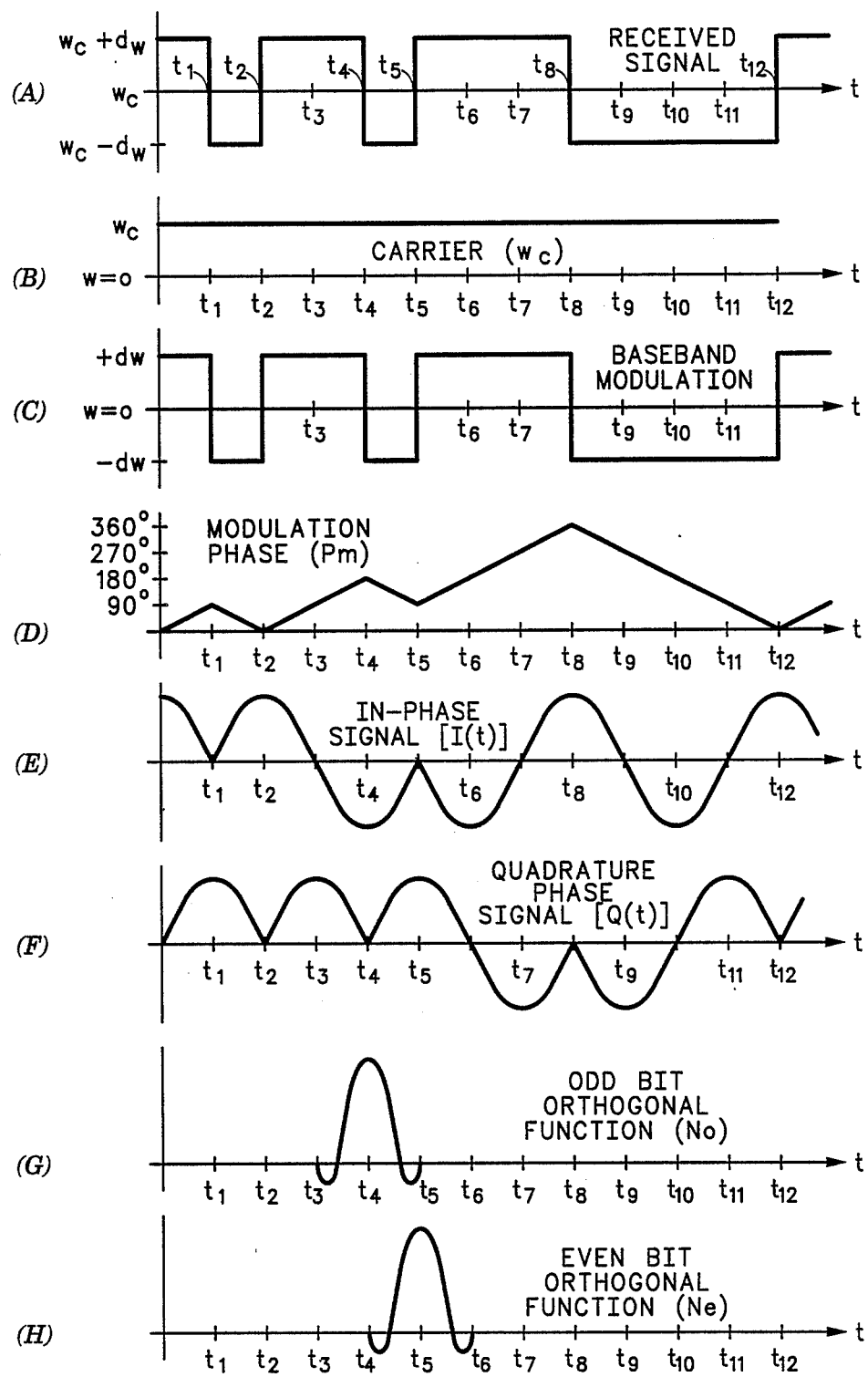
FIG. 1 includes a series of eight related graphs (labeled A-H) which illustrate signals that appear at various points in FIGS. 2 and 3. The horizontal axes of all eight graphs are identical and are subdivided into twelve divisions of equal time $t_1-t_{12}$, wherein each division $t_n$ marks the end of the nth bit of the received MSK signal. A particular graph, for example, Graph C, shall be referred to as FIG. 1-C.

The construction and operation of the embodiment of the invention illustrated in FIG. 2 will be described with reference to FIG. 1, which illustrates signals that appear at various points in the block diagram of FIG. 2. Referring to these figures, an MSK transmission is captured by antenna 202 and coupled to mixers 204 and 206. In a practical application, a receiver "front end" is typically connected between antenna 202 and mixers 204 and 206. This receiver front end would include well known receiver circuits, such as an RF amplifier, a preselecter filter, a mixer, a local oscillator, an IF amplifier, and an IF filter. Since a receiver front end is well known in the art and does not form a part of the claimed invention, it has not been included in FIG. 2.

Oscillator 208 is a controlled oscillator, such as a voltage controlled oscillator (VCO), wherein the phase of its output signal is externally controlled. Ideally, the output signal of oscillator 208 is synchronized in frequency and phase to the carrier of the received MSK signal. A phase shifter 210 shifts the phase of the oscillator output signal by 90°. The received MSK transmission is mixed down to "baseband" in mixers 204 and 206. Low pass filters 212 and 214 are designed to attenuate components of the output signals of mixers 204 and 206 that are at twice the received carrier frequency and above. The output of filter 212 shall be referred to as the "in-phase" or "I-channel", while the output of filter 214 shall be referred to as the "quadrature" or "Q-channel". Mixers 204 and 206, oscillator 208, phase shifter 210, and filters 212 and 214 are interconnected to form a well known quadrature circuit. The operation of the quadrature circuit will now be described with reference to FIG. 1.

FIG. 1-A is a graph of the frequency $w_r(t)$ of a received MSK signal. As explained above, the frequency of the received signal $w_r(t)$ is $w_c+dw$ when a binary 1 is transmitted and $w_c-dw$ when a binary 0 is transmitted, wherein $w_c$ is the carrier frequency and dw is the deviation. It is convenient to view the frequency $w_r(t)$ of the received MSK signal as the composite of a carrier frequency $w_c$ and a baseband modulation frequency $w_m(t)$. The carrier frequency $w_c$ and the baseband modulation frequency $w_m(t)$ are illustrated in FIGS. 1-B and 1-C, respectively. Thus, the frequency $w_r(t)$ of the received signal can be described by the following equation:

$$w_r(t) = w_c + w_m(t) \qquad \text{EQ-1}$$

To describe the operation of the quadrature circuit, it is convenient to work in the time domain. To begin, the received signal R(t) can be described by the following equation:

$$R(t) = \cos P_r(t) \qquad \text{EQ-2}$$

wherein $P_r(t)$ is the instantaneous phase of the received signal.

It is well known that phase is the integral of frequency. Thus, equation EQ-2 can be re-written as follows:

$$R(t) = \cos\left\{ \int_{\tau=0}^{t} [w_r(\tau)]d\tau + P_0 \right\} \qquad \text{EQ-3}$$

wherein $P_0$ is the instantaneous phase of the received signal at time $t=0$ and $\tau$ is a dummy variable of integration.

Substituting equation EQ-1 for $w_r(t)$ in the above equation yields the following:

$$R(t) = \cos\left\{ \int_{\tau=0}^{t} [w_c + w_m(\tau)]d\tau + P_0 \right\} \qquad \text{EQ-4}$$

Assuming that $w_c$ is a constant and that $P_0=0$, equation EQ-4 reduces to:

$$R(t) = \cos\left\{w_c t + \int_{\tau=0}^{t} w_m(\tau)d\tau\right\} \quad \text{EQ-5}$$

The integral in the above equation is $P_m(t)$, the instantaneous phase of the baseband modulation:

$$P_m(t) = \int_{\tau=0}^{t} w_m(\tau)d\tau \quad \text{EQ-6}$$

Substituting $P_m(t)$ for the integral in equation EQ-5 yields the following:

$$R(t)=\cos[w_c t+P_m(t)] \quad \text{EQ-7}$$

Ideally, the output of oscillator 208 is phase locked to the carrier frequency of the received signal and, therefore, the equation that describes the output signal LO(t) of oscillator 208 is simply:

$$LO(t)=\cos w_c(t) \quad \text{EQ-8}$$

The output of mixer 204 is the multiplication of the received signal (EQ-7) by the oscillator signal (EQ-8), the result of which shall be referred to as the "in-phase" signal I(t):

$$I(t)=\{\cos[w_c(t)+P_m(t)]\}\cdot\{\cos w_c(t)\} \quad \text{EQ-9}$$

Using fundamental trigonometric identities for the product of two cosine functions, equation EQ-9 reduces to:

$$I(t)=\cos P_m(t)+\cos[2w_c t+P_m(t)] \quad \text{EQ-10}$$

(A factor of ½ has been ignored in the above equation.)
The output of mixer 204 is low pass filtered by filter 212, which removes the $\cos[2w_c t+P_m(t)]$ component of equation EQ-10. Thus, the in-phase signal I(t) at the output of filter 212 can be described as:

$$I(t)=\cos P_m(t) \quad \text{EQ-11}$$

In a similar manner, the received signal R(t) is mixed with the carrier frequency in mixer 206, but, in this case, the signal from oscillator 208 is shifted 90° in phase by phase shifter 210. Thus, the output of phase shifter 210 can be described by the function $-\sin(w_c t)$. Applying a similar analysis as above, the output of low pass filter 214 is a quadrature signal Q(t) which can be described by the equation:

$$Q(t)=\sin P_m(t) \quad \text{EQ-12}$$

By substituting EQ-6 for $P_m(t)$ in equations EQ-11 and EQ-12, one can calculate the in-phase I(t) and quadrature phase Q(t) signals, which are plotted in FIGS. 1-E and 1-F, respectively. Although this appears to be a complex calculation, it is greatly simplified by the fact that the baseband modulation frequency $w_m(t)$ can only assume one of two values, either $+dw$ for a binary 1 or $-dw$ for a binary 0. Since dw equals $\frac{1}{4}^{th}$ the bit rate, the phase of the baseband modulation is either advanced by 90° ($\frac{1}{4}\cdot 360°$) when $w_m(t)=+dw$, or retarded by 90° when $w_m(t)=-dw$. Thus, it becomes a simple task to plot the phase of the baseband modulation $P_m(t)$ (FIG. 1-D) from the baseband modulation graph of FIG. 1-C. Once $P_m(t)$ is plotted, the signals in the I and Q channels are easily determined by equations EQ-11 and EQ-12, respectively. It should be noted that the in-phase I(t) and quadrature phase Q(t) signals are comprised of a series of half sine functions; the I-channel half sine functions beginning on odd numbered bits and the Q-channel half sine functions beginning on even numbered bits.

So far, we have assumed that the local oscillator is phase locked to the carrier frequency $w_c$. Although this is the desired result, a phase error e may exist between the output of oscillator 208 and the carrier frequency $w_c$. In this situation, the output of mixer 204 is the following I-channel baseband signal:

$$B_I(t)=\cos\{w_c t+[P_m(t)+e]\}\cdot\cos w_c t \quad \text{EQ-13}$$

Using fundamental trigonometric identities for the product of two cosine functions, this equation can be rewritten as follows:

$$B_I(t)=\cos[P_m(t)+e]+\cos\{2w_c t+[P_m(t)+e]\} \quad \text{EQ-14}$$

(A factor of ½ has been ignored in the above equation.)
As before, the $\cos\{2w_c t+[P_m(t)+e]\}$ component is filtered out by low pass filter 212. Thus, equation EQ-14 reduces to:

$$B_I(t)=\cos[P_m(t)+e] \quad \text{EQ-15}$$

Using fundamental trigonometric identities for the cosine of the sum of two angles, equation EQ-15 can be re-written as follows:

$$B_I(t)=\cos P_m(t)\cdot\cos(e)-\sin P_m(t)\cdot\sin(e) \quad \text{EQ-16}$$

Recall from equations EQ-11 and EQ-12 that $\cos P_m(t)$ and $\sin P_m(t)$ are the in-phase I(t) and quadrature phase Q(t) signal components, respectively. Thus, equation EQ-16 can be re-written as follows:

$$B_I(t)=I(t)\cdot\cos(e)-Q(t)\cdot\sin(e) \quad \text{EQ-17}$$

An examination of the above equation indicates that the I channel baseband signal $B_I(t)$ includes both in-phase I(t) and quadrature phase Q(t) components of the received signal when there is a phase error e between the output of oscillator 208 and the carrier of the received signal.

The Q-channel baseband signal $B_Q(t)$ (the output of filter 214) can be calculated in a similar manner as above. This signal can be described by the following equation:

$$B_Q(t)=Q(t)\cdot\cos(e)+I(t)\cdot\sin(e) \quad \text{EQ-18}$$

Thus, when oscillator 208 is not phase locked to the carrier of the received signal, the I and Q channel baseband signals include both in-phase I(t) and quadrature phase Q(t) components. When e=0°, however, $B_I(t)=I(t)$ and $B_Q(t)=Q(t)$.

In the preferred embodiment, the output of filters 212 and 214 are coupled (for example, by non-illustrated digital to analog converters) to a digital signal processor 216. The elements illustrated within the DSP are analogs of the operations that are performed by the processor and its associated software. The software to perform these functions will depend on the particular DSP selected. The particular code for the selected processor can easily be written by one skilled in the art using the analog diagram of FIG. 2 or FIG. 3, the flow chart of FIG. 4, and the following description.

To understand the operations that occur within the DSP, it is useful to view the I and Q channel baseband signals as a single baseband signal which can be expressed mathematically as a complex number; the I-channel baseband signal (the output of filter 212) forming the real (Re) part of the number, and the Q-channel baseband signal (the output of filter 214) forming the imaginary part (Im). Thus, the baseband signal B(t) is defined as follows:

$$B(t) = B_I(t) + jB_Q(t) \qquad \text{EQ-19}$$

The baseband signal B(t) is multiplied by an "odd bit" orthogonal function $N_o$ in multiplier block 218, and by an "even bit" orthogonal function $N_e$ in multiplier block 220. These two functions are identical, except that the odd function $N_o$ begins at odd numbered bits of the received signal, while the even function $N_e$ begins at even numbered bits, as illustrated in FIGS. 1-G and 1-H, respectively. Both orthogonal functions are repeated every two bit periods. The preferred orthogonal function is:

$$N(t) = \frac{\sin(2\pi t/T)}{(2\pi t/T) - [(K)(\text{sgn } t)(\pi t/2T)^2]} \quad -T \leq t \leq T \qquad \text{EQ-20}$$

wherein K is a constant. K is preferably 0.90959, although values of K that are equal to or greater than 0, but less than or equal to 2 are also suitable. Values of K greater than 2, but less than or equal to 2.5 provide marginal performance. Above 2.5, there are an infinite number of very sharply defined values of K that may also be suitable. Other orthogonal functions may also be suitable. In the above equation, "sgn t" is the algebraic sign of "t". "T" is the bit period of the received MSK transmission, and "t" is time.

For simplicity, equation EQ-20 only defines the preferred orthogonal function between the times $-T$ and $+T$. In practice, this function is generated every odd and even numbered two bit period. When generating the orthogonal function for a given two bit period, the function defined by equation EQ-20 is shifted in time such that it begins at the beginning and ends at the end of the particular two bit period. This principle is illustrated in FIGS. 1-G and 1-H wherein the orthogonal functions for the odd two bit period $t_3$–$t_5$ and the even two bit period $t_4$–$t_6$ are illustrated, respectively.

The outputs of multiplier blocks 218 and 220 are then integrated over a two bit period in blocks 226 and 227, respectively. As with the odd orthoganal function $N_o$, the integration period for block 226 begins at every odd numbered bit and ends two bit periods later. Similarly, the integration period for block 227 begins on even numbered bits and ends two bits later. Thus, the output of integration blocks 218 and 220 are defined to be $X_I$ and $X_Q$, respectively, and these outputs have the following values:

$$X_I = \int_{\tau = t_n}^{t_{n+2}} N_o(\tau)[B_I(\tau) + jB_Q(\tau)]d\tau \qquad \text{EQ-21(A)}$$

(n = odd integer)

$$X_Q = \int_{\tau = t_n}^{t_{n+2}} N_e(\tau)[B_I(\tau) + jB_Q(\tau)]d\tau \qquad \text{EQ-21(B)}$$

(n = even integer)

Collectively, blocks 218, 220, 222, and 224 provide a means for multiplying the baseband signal by an orthogonal function, while blocks 226 and 227 provide a means for integrating the product of the baseband signal and the orthogonal function. More specifically, blocks 218 and 222 provide a means for multiplying the baseband signal by an odd orthogonal function and block 226 provides a means for integrating the product of the baseband signal and the odd bit orthogonal function over an odd numbered two bit period. Similarly, blocks 220 and 224 provide a means for multiplying the baseband signal by an even orthogonal function and block 227 provides a means for integrating the product of the baseband signal and the even bit orthogonal function over an even numbered two bit period.

Recall that equations EQ-17 and EQ-18 describe the I-channel and Q-channel baseband signals $B_I(t)$ and $B_Q(t)$, respectively. These baseband signals include both in-phase I(t) and quadrature phase Q(t) components when there is a phase error e between the output of oscillator 208 and the carrier of the received MSK signal. If a phase error e exists, any quadrature phase component Q(t) present in the baseband signal $B_I(t) + jB_Q(t)$ will integrate out to zero when processing the baseband signal according to equation EQ-21(A). Thus, the quadrature signal component Q(t) can be ignored in equations EQ-17 and EQ-18 for the purpose of calculating equation EQ-21(A). The result of processing the baseband signal according to equation EQ-21(A) is a single complex number $X_I$ (one number every odd numbered bit) which is dependent only on the in-phase component I(t). Setting Q(t)=0 and substituting equations EQ-17 and EQ-18 for $B_I(t)$ and $B_Q(t)$ in equation EQ-21(A) yields the following:

$$X_I = \int_{\tau = t_n}^{t_{n+2}} N_o I(\tau)\cos(e)d\tau + j \int_{t = t_n}^{t_{n+2}} N_o I(\tau)\sin(e)d\tau \qquad \text{EQ-22(A)}$$

(n = odd integer)

Similarly, the in-phase component I(t) integrates out to zero and can be ignored for the purpose of calculating equation EQ-21(B). Thus, the result of processing the baseband signal according to equation EQ-21(B) is a single complex number $X_Q$ (one every even numbered bit) which is dependent only on the quadrature component Q(t). Setting I(t)=0 and substituting equations EQ-17 and EQ-18 for $B_I(t)$ and $B_Q(t)$ in equation EQ-21(B) yields the following:

$$X_Q = -\int_{\tau = t_n}^{t_{n+2}} N_e Q(\tau)\sin(e)d\tau + j \int_{t = t_n}^{t_{n+2}} N_e Q(\tau)\cos(e)d\tau \qquad \text{EQ-22(B)}$$

(n = even integer)

It is convenient to define the variables $A_I$ and $A_Q$ as follows:

$$A_I = \int_{\tau = t_n}^{t_{n+2}} N_o I(\tau) d\tau \qquad \text{EQ-23(A)}$$

$$A_Q = \int_{\tau = t_n}^{t_{n+2}} N_e Q(\tau) d\tau \qquad \text{EQ-23(B)}$$

Assuming that the phase error e is constant over the two bit integration period and substituting $A_I$ or $A_Q$ for the corresponding integral, equations EQ-22(A) and EQ-22(B) reduce to the following:

$$X_I = A_I \cdot \cos(e) + j \cdot A_I \cdot \sin(e) \qquad \text{EQ-24(A)}$$

$$X_Q = -A_Q \cdot \sin(e) + j \cdot A_Q \cdot \cos(e) \qquad \text{EQ-24(B)}$$

The DSP calculates $X_I$ at every odd numbered bit and $X_Q$ at every even numbered bit. In other words, the values of $A_I \cos(e)$ and $A_I \sin(e)$ are known at every odd numbered bit, and $-A_Q \sin(e)$ and $A_Q \cos(e)$ are known at every even numbered bit. Since the tangent of an angle is equal to the sine of the angle divided by its cosine, the phase error e can be calculated at odd numbered bits by computing the inverse tangent of the imaginary part of equation EQ-24(A) divided by the real part. Similarly, the phase error e can be calculated at even numbered bits by computing the inverse tangent of minus (−) the real part of equation EQ-24(B) divided by the imaginary part. In mathematical terms:

$$e_I = \text{TAN}^{-1}\left[\frac{Im(X_I)}{Re(X_I)}\right] \qquad \text{EQ-25(A)}$$

$$e_Q = \text{TAN}^{-1}\left[\frac{-Re(X_Q)}{Im(X_Q)}\right] \qquad \text{EQ-25(B)}$$

The operations described in equations EQ-25(A) and EQ-25(B) are performed in blocks 228 and 229, respectively. Unfortunately, each of these operations theoretically computes two supplementary angles (i.e., separated by 180°), one of which is the phase error between the received MSK signal and the output of oscillator 208. Thus, blocks 228 and 229 provide a means for calculating two supplementary angles from the integral of the product of the baseband signal and the orthogonal function. It should be understood, however, that it is not necessary for this angle computing means to actually compute both angles. Since one angle is the supplement of the other, the second angle can be computed from the first by merely adding or subtracting 180°. Furthermore, it is not necessary that the computation of the supplementary angle be performed in blocks 228 and 229. In the preferred embodiment, the supplementary angles are actually computed in block 230, which is described below.

This ambiguity in the phase is not unexpected, however, since the DSP does not know at this point in the process whether the present bit of the received message is a binary 1 or a binary 0. To resolve which one of these two supplementary angles is the actual phase error, a phase error algorithm 230 compares the two supplementary angles theoretically computed from equation EQ-25(A) or EQ-25(B) and selects the one that is closer to the phase error that was computed for the previous bit. Thus, phase error algorithm 230 provides a means for resolving this phase ambiguity, i.e., which one of the supplementary angles is the phase error between the carrier of the MSK transmission and the output of the oscillator.

Figure 4:
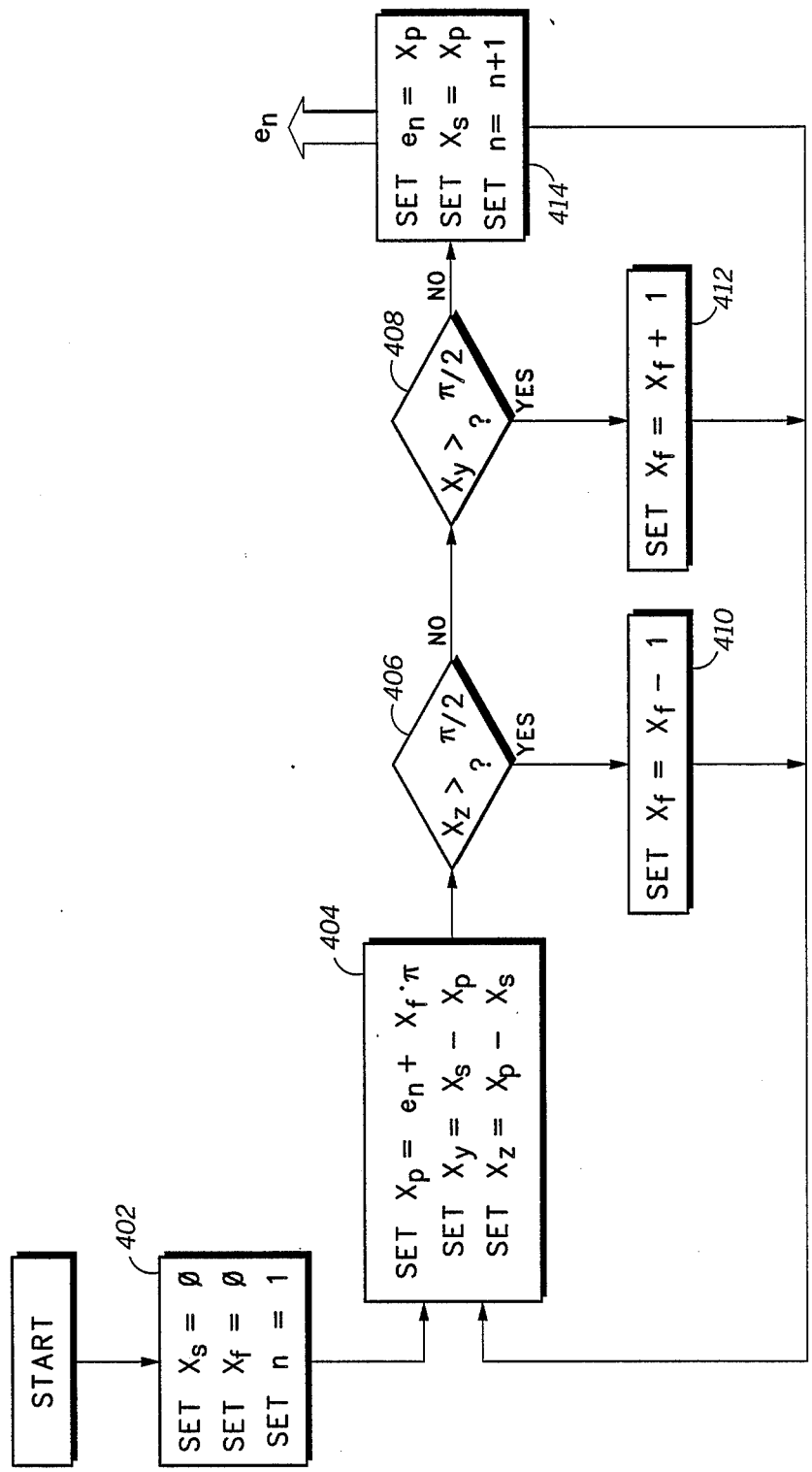
FIG. 4 is a flow chart of the phase ambiguity algorithm of FIGS. 2 and 3.

The flow chart for the preferred phase error algorithm is illustrated in FIG. 4. At this point in the process, it is unimportant whether the phase error was calculated on an odd bit ($e_I$) or on even bit ($e_Q$), and the phase error e for the $n^{th}$ bit of the received MSK signal is simply referred to as $e_n$. Furthermore, even though equations EQ-25(A) and EQ-25(B) theoretically compute two supplementary angles, only one of these two angles (preferably the acute angle) needs to be calculated. Thus, in practice, the output of blocks 228 and 229 (the input to phase error algorithm 230) is a single acute (specifically, $-90° \leq e_n \leq 90°$) angle $e_n$ from which the phase error algorithm can calculate the supplement simply by adding or subtracting 180°.

Referring to FIG. 4, the variables $X_s$, $X_f$ and n are initialized in block 402 to the values 0, 0 and 1, respectively. Block 402 is only executed to set the values of $X_s$, $X_f$ and n for the first bit of the received MSK message. For all subsequent bits, however, the values of $X_s$, $X_f$ and n are set elsewhere in the program. In block 404, the variables $X_p$, $X_y$ and $X_z$ are calculated as follows: $X_p = e_n + X_f \cdot 180°$; $X_y = X_s - X_p$; and $X_z = X_p - X_s$. $X_s$ is the phase error of the previously received bit of the MSK message and its value is arbitrarily set to zero in initialization block 402 for the first bit of the received MSK signal. n represents the "$n^{th}$" bit of the received MSK signal. $X_p$ is a dummy variable that can be set equal to the angle $e_n$ or one of its supplements ($X_f$ can assume the values −1, 0, and 1). $X_y$ is equal to the difference between the phase error $X_s$ of the previously received bit and the phase angle of the present bit $e_n$ (or one of its supplements). $X_z$ is simply $-X_y$.

The difference between the phase error of the previous bit of the received MSK signal and $X_p$ is tested in blocks 406 and 408. If this difference is greater than 90° and less than −90°, the value of $X_f$ is adjusted in step 410 or 412. The values of $X_p$, $X_y$ and $X_z$ are then recalculated in step 404. If the difference between the phase error of the previous bit and $X_p$ is less than 90° but greater than −90°, $X_p$ is the actual phase error $e_n$ of the present bit and the program passes through steps 406 and 408 to step 414. In step 414, the resolved phase error $e_n$ is passed on to the next circuit (for example, to the control input of the VCO in FIG. 2), the variable $X_s$ is set equal to the resolved phase error, and n is incremented in preparation for the next angle from block 228 or 229.

Returning to FIG. 2, a well known discriminator 232, limiter 234 and phase locked loop 236 provide a timing signal to the DSP at the "zero crossings" of the received signal R(t). This permits the DSP to start and stop the generation of the orthogonal functions $N_o$ and $N_e$, and to start and stop the integration periods of integration blocks 226 and 227 at the proper times.

Once the correct phase error e has been calculated, it can be used to adjust the phase of oscillator 208 so that the phase of its output signal is substantially identical to the phase of the received MSK signal. Thus, in the embodiment of FIG. 2 (and in the embodiment of FIG. 3, described below), blocks 218, 220, 222, 224, 226, 227, 228, 229 and 230 provide a phase error means for determining the phase error between the carrier of an MSK transmission and the output of the oscillator in the quadrature circuit. If oscillator 208 is a conventional analog VCO, the phase error signal e can be coupled to the control input of the VCO through a non-illustrated digital to analog converter. Once the phase of oscillator 208 has been synchronized to the phase of the carrier of the received MSK signal, the I and Q channel baseband signals (the outputs of filters 212 and 214) can be coupled to a non-illustrated quadrature MSK demodulator. Such demodulators are well known in the art.

Figure 2:
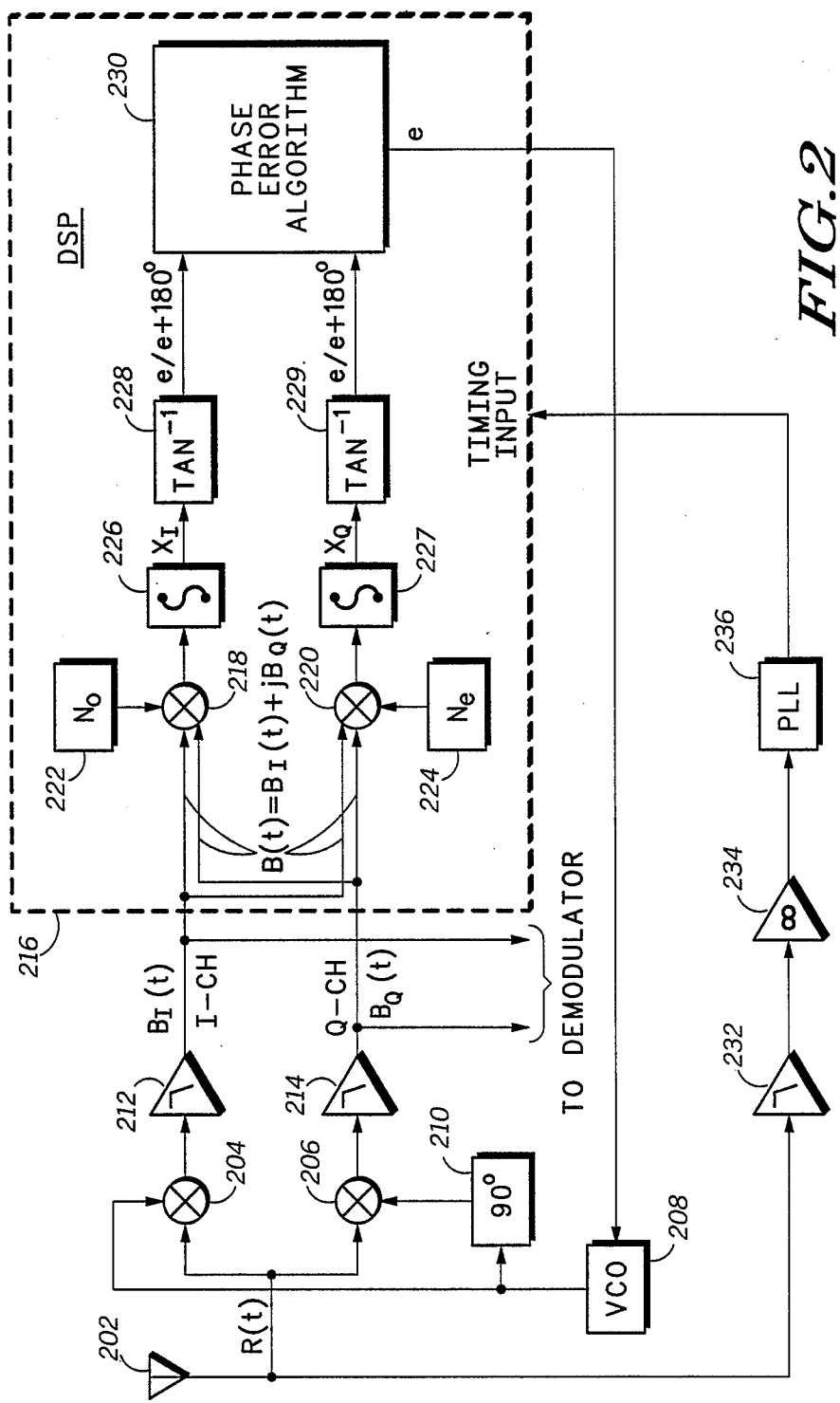
FIG. 2 is a block diagram of one embodiment of the present invention.
Figure 3:
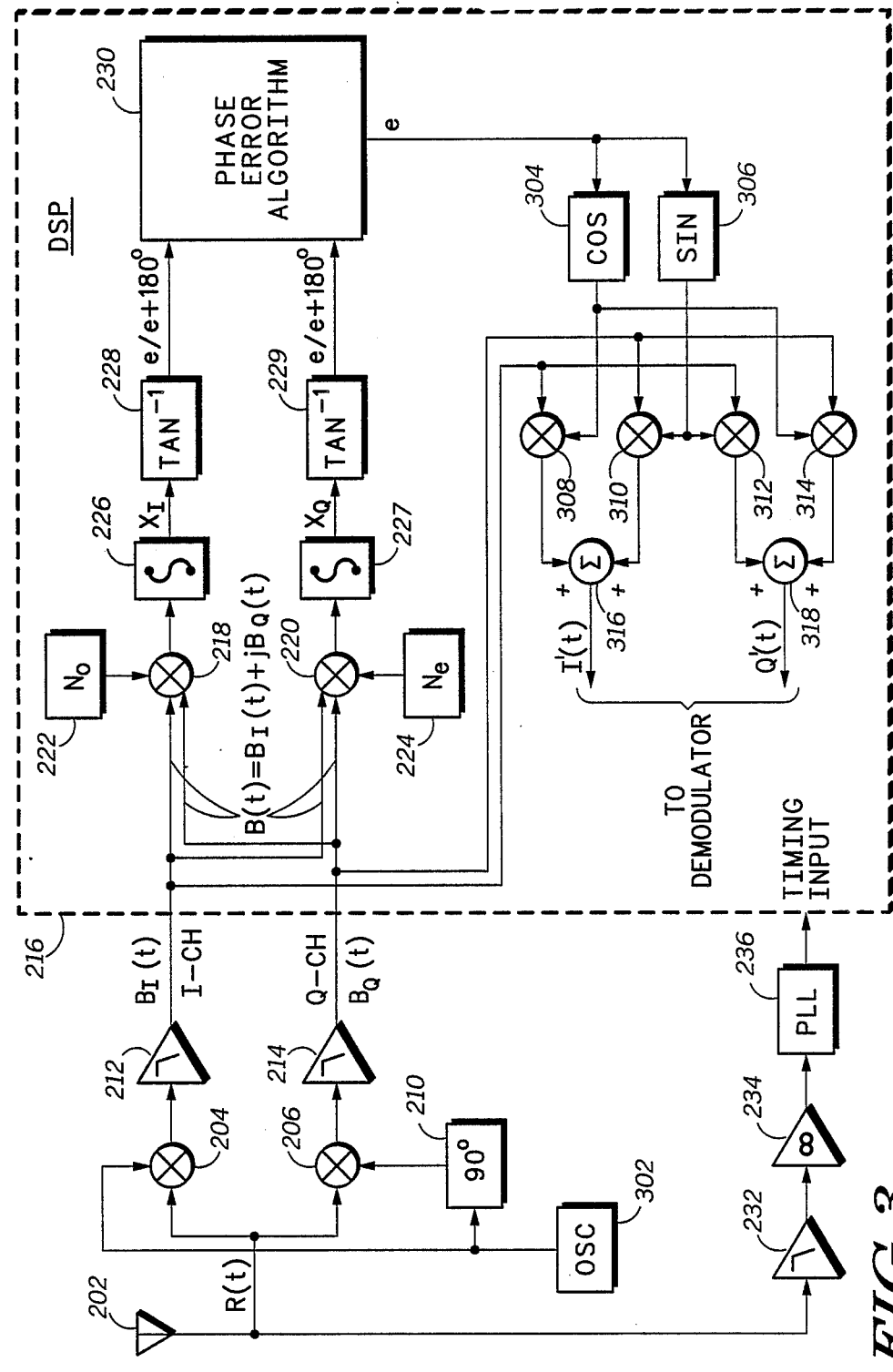
FIG. 3 is a block diagram of a second embodiment of the present invention.

A second embodiment of the invention is illustrated in FIG. 3. Referring to this figure, antenna 202, mixers 204 and 206, phase shifter 210 and filters 212 and 214 are as described with reference to FIG. 2. Oscillator 302, however, is not a phase controlled oscillator, as was oscillator 208 of FIG. 2. Instead, oscillator 302 may be any well known oscillator having an output frequency approximately equal to the carrier frequency of the received MSK signal. In addition, multipliers 218 and 220, orthogonal functions 222 and 224, integrators 226 and 227, and phase error algorithm 230 are also as described above with reference to FIG. 2.

The primary distinction between these two embodiments is that the phase error e is not utilized in the embodiment of FIG. 3 to adjust the phase of the local oscillator (208) of the quadrature circuit, as it was in the embodiment of FIG. 2. Instead, the cosine and sine of the phase error e are computed in blocks 304 and 306, respectively. The cosine of the phase error e is then multiplied by the I-channel signal and the Q-channel signal in multiplier blocks 308 and 314, respectively. Similarly, the sine of the phase error e is multiplied by the Q-channel signal and the I-channel signal in multiplier blocks 310 and 312, respectively. The output of multiplier blocks 308 and 310 are then summed in block 316, the output of which is a corrected I-channel signal I'(t). Similarly, the output of multiplier blocks 312 and 314 are summed in block 318, the output of which is a corrected Q-channel signal Q'(t). Thus, blocks 304, 306, 308, 310, 312, 314, 316, and 318 provide a correction means for generating a corrected baseband signal. This corrected baseband signal includes a corrected I-channel component in which any quadrature component of the MSK transmission is substantially attenuated, and a corrected Q-channel component in which any in-phase component is substantially attenuated. The corrected I-channel I'(t) and corrected Q-channel Q'(t) signals are then coupled to the non-illustrated quadrature MSK demodulator that was described above with reference to FIG. 2.

In the embodiment of FIG. 3, the timing for DSP 216 is established by discriminator 232, limiter 234 and PLL 236, as described above with reference to the embodiment of FIG. 2.

Although the preferred embodiments illustrated in FIGS. 2 and 3 utilize a digital signal processor, the invention may also be practiced by implementing the functions that are performed by the DSP with digital or analog hardware. Similarly, if the frequency of the received MSK signal (or the IF frequency output of the receiver front end described above) is low enough, mixers 204 and 206, oscillator 208 or 302, phase shifter 210, and low pass filters 212 and 214 could be implemented using digital circuitry, or the received MSK signal can be digitized and these functions can be performed in the DSP.

We claim as our invention:

1. A receiver circuit for receiving an MSK transmission and for use with a quadrature circuit having a baseband signal output and including an oscillator, said receiver circuit comprising in combination:
   multiplication/integration means for multiplying said baseband signal by an orthogonal function and for integrating the product of said baseband signal and said orthogonal function;
   angle computing means for computing two supplementary angles from the integral of the product of said baseband signal and said orthogonal function; and
   resolving means for resolving which one of said two supplementary angles is the phase error between the carrier of said MSK transmission and the ouput of said oscillator.

2. The receiver circuit of claim 1, wherein: said multiplication/integration means includes means for multiplying said baseband signal by an odd bit orthogonal function and for integrating the product of said baseband signal and said odd bit orthogonal function over an odd numbered two bit period of said MSK transmission, and means for multiplying said baseband signal by an even bit orthogonal function and for integrating the product of said baseband signal and said even bit orthogonal function over an even numbered two bit period of said MSK transmission.

3. The receiver circuit of claim 2, wherein said angle computing means includes:
   means for determining TAN-1 [lm(Xl)/Re(Xl)], wherein Xl is the integral of the product of said baseband signal and said odd bit orthogonal function over said odd numbered two bit period; and
   means for determining Tan-1[-Re(XQ)/lm(XQ)], wherein XQ is the integral of the product of said baseband signal and said even bit orthogonal function over said even numbered two bit period.

4. The receiver circuit of claim 1, wherein said orthogonal function includes the function $\sin(2\pi t/T)/\{(2\pi t/T - [K \cdot \text{sgn}(t) \cdot (\pi t/2T)^2]\}$, wherein T is the bit period of the MSK transmission, t is time and K is a constant.

5. The receiver circuit of claim 4, wherein $0 \leq K \leq 2$.

6. The receiver circuit of claim 1, wherein said resolving means includes means for determining the particular one of said two supplementary angles that is closer to the phase error of the previously received bit of said MSK transmission.

7. The receiver of claim 1, wherein said multiplication/integration means, said angle computing means, and said resolving means comprise digital signal processor.

8. A receiver circuit for receiving an MSK transmission, comprising in combination:
   a quadrature circuit having a baseband signal output and including an oscillator having a controlled input for controlling the phase of the signal generated by said oscillator; and
   phase error means, coupled between said quadrature circuit and said control input of said oscillator, for determining the phase error between the carrier of said MSK transmission and the signal generated by said oscillator, such that the phase of said oscillator is adjusted by said phase error means to reduce said phase error, wherein said phase error means includes:
   multiplication/integration means for multiplying said baseband signal by an orthogonal function and for integrating the product of said baseband signal and said orthogonal function;

angle computing means for computing two supplementary angles from the integral of the product of said baseband signal and said orthogonal function; and resolving means for resolving which one of said two supplementary angles is the phase error between the carrier of said MSK transmission and the output of said oscillator.

9. The receiver circuit of claim 8, wherein said multiplication/integration means includes means for multiplying said baseband signal by an odd bit orthogonal function and for integrating the product of said baseband signal and said odd bit orthogonal function over an odd numbered two bit period of said MSK transmission, and means for multiplying said baseband signal by an even bit orthogonal function and for integrating the product of said baseband signal and said even bit orthogonal function over an even numbered two bit period of said MSK transmission.

10. The receiver circuit of claim 9, wherein said angle computing means includes:
means for determining TAN-1 [lm(Xl)/Re(Xl)], wherein Xl is the integral of the product of said baseband signal and said odd bit orthogonal function over said odd numbered two bit period; and
means for determining Tan-1[-Re(XQ)/lm(XQ)], wherein XQ is the integral of the product of said baseband signal and said even bit orthogonal function over said even numbered two bit period.

11. The receiver circuit of claim 8, wherein said orthogonal function includes the function $\sin(2\pi t/T)/\{(2\pi t/T)-[K \cdot \text{sgn}(t) \cdot (\pi t/2T)^2]\}$, wherein T is the bit period of the MSK transmission, t is time and K is a constant 12. The receiver circuit of claim 11, wherein $0 \leq K \leq 2$.

13. The receiver of claim 8, wherein said multiplication/integration means, said angle computing means, and said resolving means comprise digital signal processor.

14. A receiver circuit for receiving an MSK transmission and for use with a quadrature circuit having a baseband signal output and including an oscillator, said receiver circuit comprising in combination:
phase error means, coupled to said quadrature circuit, for determining the phase error between the carrier of said MSK transmission and the signal generated by said oscillator: and
correction means, coupled to said phase error means, for generating a corrected baseband signal, said corrected baseband signal including a corrected l-channel signal in which any quadrature phase component of said MSK transmission is substantially attenuated, and further including a corrected Q-channel signal in which any in-phase component of said MSK transmission is substantially attenuated, wherein said phase error means includes:
multiplication/integration means for multiplying said baseband signal by an orthogonal function and for integrating the product of said baseband signal and said orthogonal function;
angle computing means for computing two supplementary angles from the integral of the product of said baseband signal and said orthogonal function; and
resolving means for resolving which one of said two supplementary angles is the phase error between the carrier of said MSK transmission and the output of said oscillator.

15. The receiver circuit of claim 14, wherein said multiplication/integration means includes means for multiplying said baseband signal by an odd bit orthogonal function and for integrating the product of said baseband signal and said odd bit orthogonal function over an odd numbered two bit period of said MSK transmission, and means for multiplying said baseband signal by an even bit orthogonal function and for integrating the product of said baseband signal and said even bit orthogonal function over an even numbered two bit period of said MSK transmission.

16. The receiver circuit of claim 15, wherein said angle computing means includes:
means for determining TAN-1 [lm(Xl)/Re(Xl)], wherein Xl is the integral of the product of said baseband signal and said odd bit orthogonal function over said odd numbered two bit period; and
means for determining Tan-1[-Re(XQ)/lm(XQ)], wherein XQ is the integral of the product of said baseband signal and said even bit orthogonal function over said even numbered two bit period.

17. The receiver circuit of claim 14, wherein said orthogonal function includes the function $\sin(2\pi t/T)/\{(2\pi t/T)-[K \cdot \text{sgn}(t) \cdot (\pi t/2T)^2]\}$, wherein T is the bit period of the MSK transmission, t is time and K is a constant.

18. The receiver circuit of claim 17, wherein $0 \leq K \leq 2$.

19. The receiver circuit of claim 14, wherein said resolving means includes means for determining the particular one of said two supplementary angles that is closer to the phase error of the previously received bit of said MSK transmission.

20. The receiver of claim 14, wherein said multiplication/integration means, said angle computing means, and said resolving means comprise digital signal processor.

* * * * *